US006880258B2

(12) United States Patent
Adams et al.

(10) Patent No.: US 6,880,258 B2
(45) Date of Patent: Apr. 19, 2005

(54) DIGITAL INCLINOMETER AND RELATED METHODS

(75) Inventors: John Adams, Champaign, IL (US); Marty Hendrickson, Champaign, IL (US)

(73) Assignee: Horizon Hobby, Champaign, IL (US)

( * ) Notice: Subject to any disclaimer, the term of this patent is extended or adjusted under 35 U.S.C. 154(b) by 0 days.

(21) Appl. No.: 10/648,460

(22) Filed: Aug. 26, 2003

(65) Prior Publication Data

US 2005/0044738 A1 Mar. 3, 2005

(51) Int. Cl.$^7$ .............................. G01C 9/00; G01C 15/10
(52) U.S. Cl. ..................... 33/371; 33/366.11; 33/520; 33/318
(58) Field of Search ..................... 33/370–371, 366.11, 33/366.13, 366.14, 318–330, 520, 530, 644

(56) References Cited

U.S. PATENT DOCUMENTS

| | | | |
|---|---|---|---|
| 2,737,722 A | * | 3/1956 | Keim ......................... 33/530 |
| 3,469,322 A | * | 9/1969 | Eriksson ..................... 33/370 |
| 3,924,461 A | * | 12/1975 | Stover ....................... 33/523.2 |
| 4,038,876 A | | 8/1977 | Morris |
| 4,231,252 A | | 11/1980 | Cherkson |
| 4,277,895 A | | 7/1981 | Wiklund |
| 4,434,558 A | * | 3/1984 | Face et al. .................... 33/533 |
| 4,473,960 A | * | 10/1984 | Face et al. ............... 33/366.14 |
| 4,747,216 A | | 5/1988 | Kelly et al. |
| 5,012,588 A | | 5/1991 | Face, III |
| 5,031,330 A | * | 7/1991 | Stuart ..................... 33/366.12 |
| 5,067,674 A | | 11/1991 | Heyche et al. |
| 5,142,485 A | | 8/1992 | Rosenberg et al. |
| 5,210,954 A | | 5/1993 | Schafler |
| 5,331,578 A | | 7/1994 | Stieler |
| 5,383,363 A | | 1/1995 | Kulmaczewski |
| 5,440,817 A | | 8/1995 | Watson et al. |
| 5,724,265 A | | 3/1998 | Hutchings |
| 5,832,422 A | | 11/1998 | Wiedenhoefer |
| 5,834,623 A | | 11/1998 | Ignagni |
| 5,955,667 A | | 9/1999 | Fyfe |
| 5,988,562 A | | 11/1999 | Linick |
| 6,032,090 A | | 2/2000 | von Bose |
| 6,076,269 A | * | 6/2000 | Sekino et al. ................. 33/371 |
| 6,301,964 B1 | | 10/2001 | Fyfe et al. |
| 6,353,793 B1 | | 3/2002 | Godwin et al. |
| 6,456,905 B1 | | 9/2002 | Katz et al. |
| 6,466,198 B1 | | 10/2002 | Feinstein |
| 6,480,119 B1 | | 11/2002 | McElhinney |

* cited by examiner

*Primary Examiner*—G. Bradley Bennett
*Assistant Examiner*—Yaritza Guadalupe
(74) *Attorney, Agent, or Firm*—Cook, Alex, McFarron, Manzo, Cummings & Mehler Ltd.

(57) ABSTRACT

An inclinometer for measuring the angle between a reference angular position and an angularly adjustable surface, such as on the control surfaces of a model aircraft. In one form, the inclinometer has a beam and a pair of opposed arms attached to the beam with centering faces to attach the inclinometer to the leading and trailing edges of the adjustable surface. In another form, the inclinometer has opposed gripping faces to attach to opposite sides of the adjustable surface. A pair of accelerometers sense the earth's gravitational vector and supply output signals to a data processor. The data processor determines a first reference position and a second angular position of the adjustable surface to determine the angle of the adjustable surface. A display receives information from the data processor to display the angle. Related methods are also disclosed.

28 Claims, 3 Drawing Sheets

US 6,880,258 B2

DIGITAL INCLINOMETER AND RELATED METHODS

FIELD OF THE INVENTION

The present invention relates generally to measuring instruments. More particularly, the invention relates to apparatus and methods for measuring the angle of an adjustable surface.

BACKGROUND OF THE INVENTION

Accelerometers are frequently used to measure acceleration and deceleration. From these rates of acceleration, speed and distance can also be calculated. For example, one application for accelerometers is in inertial navigation systems such as those taught in U.S. Pat. No. 5,331,578 to Stieler.

Inclinometers are used to measure angular position or the inclination of an object or surface. Accelerometers may be utilized in the measurement of angles. For example, U.S. Pat. No. 4,231,252 to Cherkson uses accelerometers to determine the direction of a borehole in the ground. Cherkson uses an accelerometer of the pendulum type. While useful for their intended purposes, such accelerometers and inclinometers tend to be complex, bulky and expensive.

With respect to model aircraft, it is generally necessary to set the position of the wings to a suitable angle or position for takeoff. For example, the control surface of the wing of a model airplane can be set to a preferred position, or within a range of angles, for best takeoff from the ground. The ability to confirm that the control surfaces of the model airplane are properly set for takeoff can be of considerable usefulness and assistance to those persons with limited experience in operating model aircraft. Such persons with limited experience have a tendency to set the control surfaces at a maximum angle for takeoff. This maximum angle setting is neither typically needed nor desirable. In fact, maximum angle settings may result in the abnormal flight behavior, and damage to, or destruction of, the model aircraft.

There has been a long-felt need for a measurement device to measure the inclination of all, or a part of, the control surfaces of a model airplane wing, such as the setting of the angle of the control surfaces of the wing. Of course, such a measurement device for model aircraft needs to be lightweight, inexpensive and preferably simple to use.

Accordingly, it is a general object of the present invention to provide an apparatus suitable for measuring the angles of adjustable surfaces, such as from a preset or normal position.

Another object of the present invention is to provide such a measurement device that is light, easy to use and that accurately displays the angle of the adjustable surfaces.

Yet another object of the present invention is to accurately measure the effective angle of an entire surface, including the adjustable surface.

A further object of the present invention is to provide methods for measuring the angles of adjustable surfaces.

A still further object of the present invention is to provide such apparatus and methods for measuring the angles of adjustable control surfaces on model airplanes.

BRIEF SUMMARY OF THE INVENTION

This invention is directed to apparatus and methods for measuring the angle between a reference angle and an angularly adjustable surface, such as on the control surfaces of model aircraft.

In one embodiment, the inclinometer is in the form of a generally linear beam with a pair of arms extending from the beam in a spaced-apart and opposing relationship. A pair of accelerometers, a data processor and a display are mounted on the beam. Opposite ends of the arms have centering faces for centering the inclinometer on the leading and trailing edges of the adjustable surface. The adjustable surface may have a fixed portion and an angularly adjustable portion. At least one of the arms may be slidably attached to the beam for adjusting to the distance between opposite edges of the adjustable surface, and have means to fix or lock the position of the arms to the beam when the inclinometer is installed on the adjustable surface.

In another embodiment, the inclinometer is in the form of a clamping device to attach the inclinometer to the adjustable surface by gripping opposite sides of the adjustable surface. For example, the clamping device may be equipped with opposing jaws. A pair of accelerometers, a data processor and a display are mounted on the clamping device.

The pair of accelerometers senses the gravitational vector of the earth. Each of the accelerometers provides an output signal to a data processor. The data processor determines the first or reference angle when the adjustable surface is in a first or reference position. The data processor also determines the angle of a second adjusted position of the adjustable surface, and determines the angle between the first reference position and the second adjusted position. The data processor then supplies information concerning the measured angle to a display for displaying the angle of the adjustable surface from the reference position.

The present invention further includes methods for measuring the angle of an adjustable surface between a first reference position and a second adjusted position. The inclinometer is attached to the adjustable surface and the gravitational vector of the earth is sensed with two accelerometers. Output signals from each accelerometer are provided to a data processor, which determines the angular position of the adjustable surface in a first or reference position. The data processor then similarly determines the position of the adjustable surface in a second adjusted position. The angle between the first reference position and the second adjusted position is then determined by the data processor, and information concerning the angle is provided by the data processor to a display. The angle is then displayed on the display.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the figures in which like reference numerals identify like elements, and in which:

DESCRIPTION OF THE PREFERRED EMBODIMENT

Figure 1:
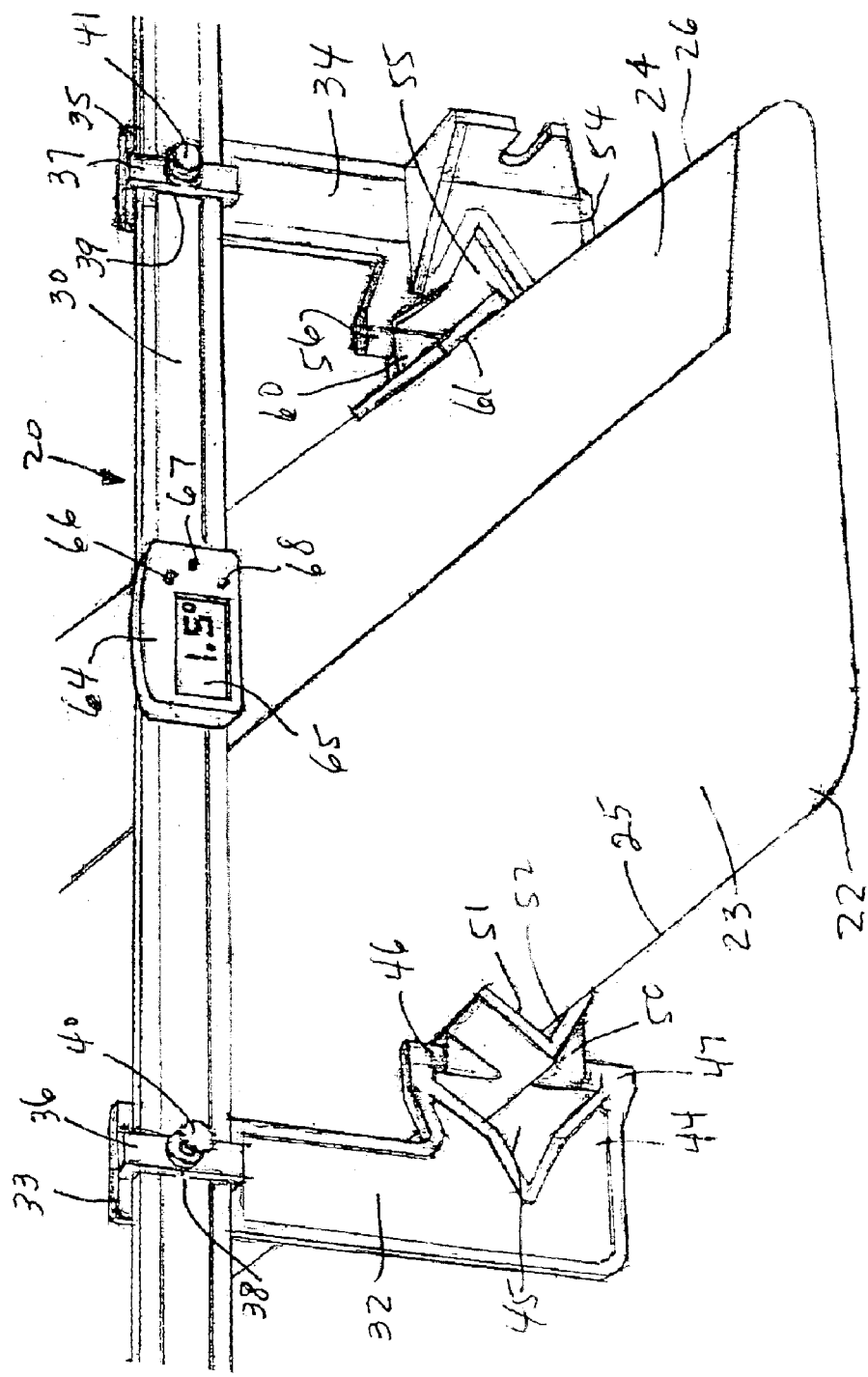
FIG. 1 is a perspective view of a first embodiment of the digital inclinometer of the present invention applied between the leading edge and the trailing edge of an adjustable surface, such as a control surface of an aircraft, to measure the effective angle thereof.

The present invention of an inclinometer, generally designated 20, for measuring the angle of an adjustable surface, such as the wing 22 of an airplane is shown in FIG. 1. Wing 22 may typically consist of a stationary portion 23 and a movable control surface 24. The stationary portion 23 defines a leading edge 25 of the wing 22, and the control surface 24 defines a trailing edge 26 of the wing 22.

Inclinometer 20 includes a generally linear beam 30. Slidably mounted to the beam 30 are a pair of arms 32 and 34 that extend generally perpendicular to the beam 30. One end 33 of arm 32 may have a raised portion 36 with a generally rectangular aperture 38 defined transversely therethrough for slidably receiving and engaging the beam 30. A thumbscrew 40, or the like, may be used to fix the position of arm 32 relative to beam 30. Other means of frictionally engaging the arms 32 and 32 to beam 30 may alternatively be employed.

Arm 34 similarly has a raised portion 37 with an aperture 39 defined therethrough for receiving and engaging the beam 30, such that arm 34 is disposed in opposing relationship to arm 32. Arm 34 may also be provided with a thumbscrew 41 for securing the position of arm 34 relative to the beam 30.

Arm 32 has an inwardly disposed end 44 that has a downwardly disposed pin 46 near the upper portion of the end 44 and an upwardly disposed pin 47 near the lower portion of the end 44. Pins 46 and 47 may generally be in axial alignment. A notched out area 45 is defined in the end 44 between the pins 46–47. A centering device 50 includes a pair of faces 51 and 52 that are angularly disposed at approximately 90° with respect to each other, and at approximately 45° with respect to the horizontal. Centering device 50 is mounted on the pins 46, 47 to swivel about the vertically disposed axis defined by pins 46 and 47 since the leading edge 25 and the trailing edge 26 of the wing 22 are not generally parallel. The notched out area 45 permits the centering device 50 to freely swivel through a range of angles to enable the inclinometer 20 to adapt to the leading edges of virtually all potential wing designs.

Arm 34 is designed in a complementary manner to arm 32. An inwardly disposed end 54 of arm 34 has a downwardly disposed pin 56 near an upper portion of the end 54 and an upwardly disposed pin (not shown) near a lower portion of end 54. These pins may be in general axial alignment in the vertical direction. A notched out area 55 is defined in the end 54 between the pins. A centering device 60 includes a pair of faces, such as face 61, are angularly disposed at approximately 90° with respect to each other, and at approximately 45' with respect to the horizontal. Centering device 60 is mounted to the pins, including pin 56, to swivel about a vertical axis. Notched out area 55 permits the centering device 60 to swivel through a broad range of angles to accommodate virtually any wing design.

The downwardly disposed arms 32, 34 are arranged such that the centering devices 50, 60 face each other in a spaced-apart and opposed relationship. The inclinometer 20 is placed on the wing by having the centering devices 50, 60 engage the leading edge 25 and the trailing edge 26 of the wing 22. The angled faces of the centering devices then center on the leading and trailing edges of the wing. The thumbscrews 40, 41 may then be tightened to retain the inclinometer 20 on the wing 22.

The beam 30, arms 32, 34, and the centering devices 50, 60 may be formed by any appropriate means and with any appropriate materials. For example, these elements of inclinometer 20 may be formed of injection molded plastics.

Many alternative designs and variations may be implemented for the inclinometer 20. For example, one arm 32 may be fixed in relation to beam 30, with the other arm 34 moveable to adjust for the size of the wing 22. Instead of separate swiveling centering devices 50, 60, the arms 32, 34 may be made to swivel, or to flex where less angular movement is needed or required. Additionally, the faces of the centering devices may be made with a continuous curvature instead of the illustrated flat faces.

Figure 3:
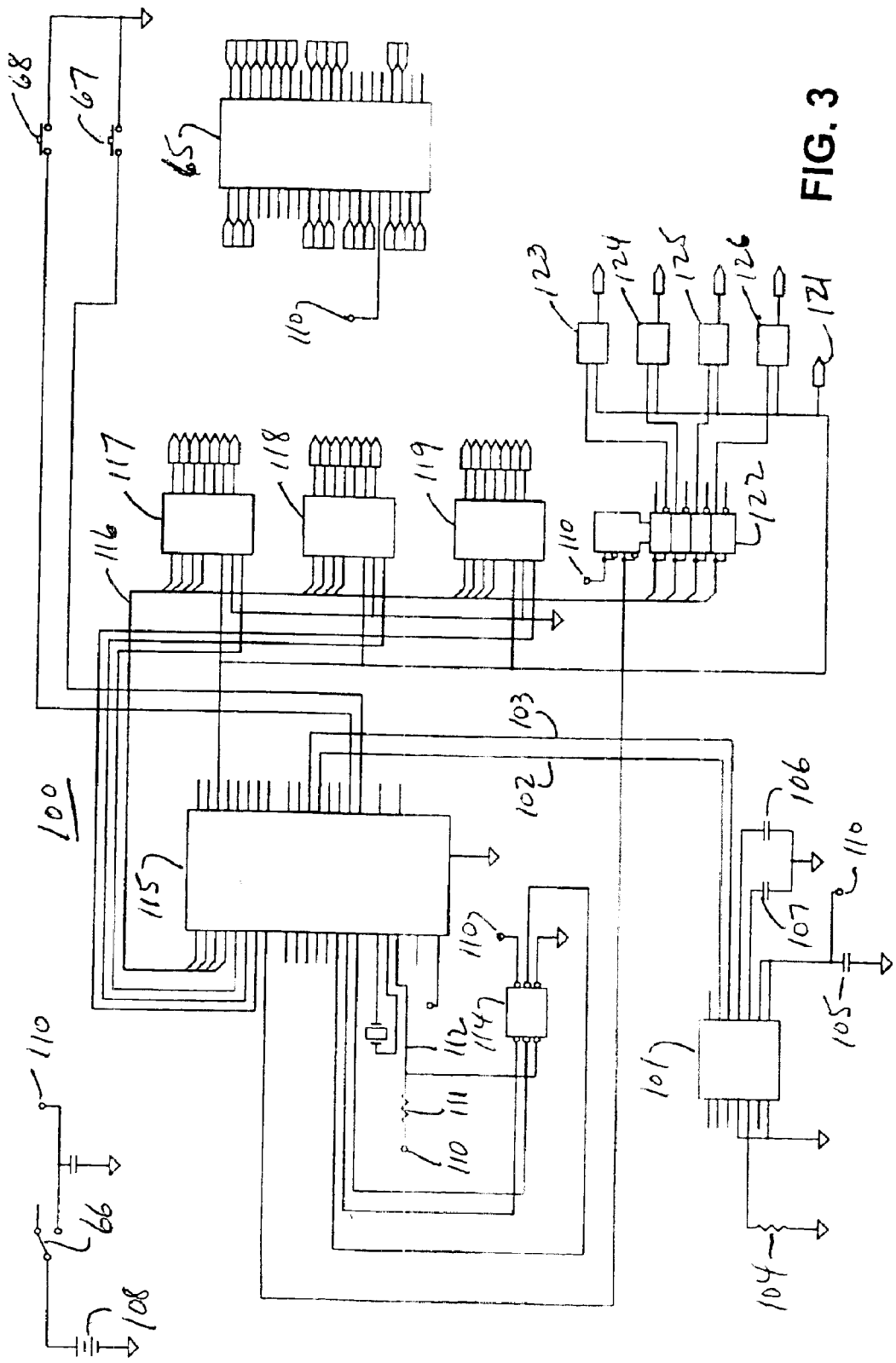
FIG. 3 is a schematic circuit diagram of the electronic circuitry for both embodiments of the digital inclinometer shown in FIGS. 1 and 2.

Attached to the beam 30 is an electronic module 64 for containing the electronic circuitry, generally designated 100 in FIG. 3, for the inclinometer 20. Electronic module 64 includes a display 65 for displaying the angular setting of the wing 22, and a plurality of switches 66–68. Switches 66–68 may be for on/off power control, for setting a reference angle and for holding the readout of the display 65, as further described below with respect to FIG. 3.

Figure 2:
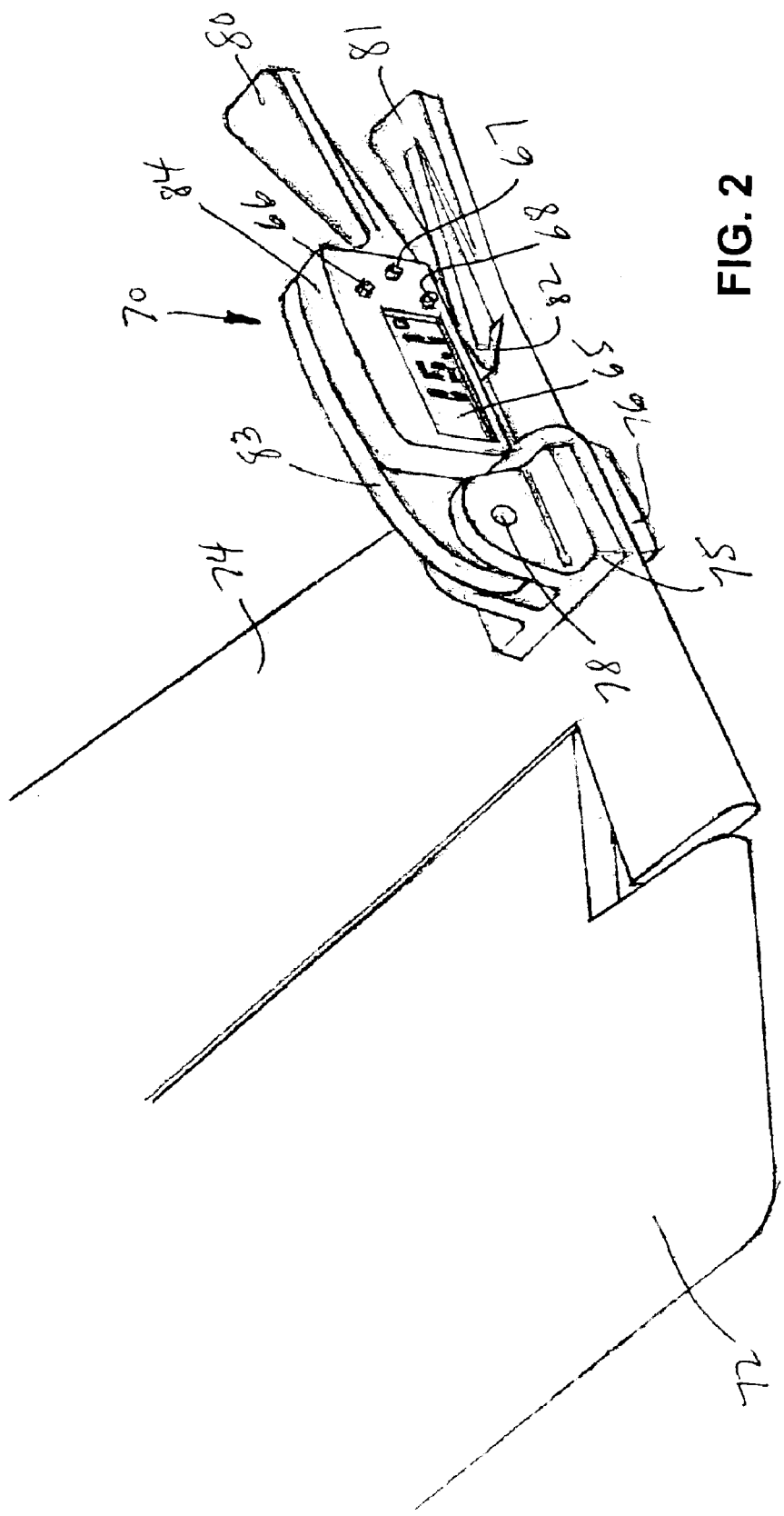
FIG. 2 is a perspective view of a second embodiment of the digital inclinometer of the present invention applied to an adjustable surface, such as a control surface of an aircraft, to measure the angle thereof.

An alternate embodiment of an inclinometer, generally designated 70, suited for measuring the angle of an adjustable surface, such as the control surface 74 of a wing 72 of an aircraft is shown in FIG. 2. While the inclinometer 20 in FIG. 1 measures the effective angle of the wing 22 from the leading edge 25 to the trailing edge 22, the inclinometer 70 of FIG. 2 measures the angle of the control surface 74. To this end, inclinometer 70 has a pair of jaws 75 and 76 that engage and clamp against the top and bottom sides of control surface 74. Top jaw 75 may have a pivoting joint 78 since the top and bottom surfaces of control surface 74 may not be in planar relationship. In fact, these top and bottom surfaces will typically have some small amount of curvature. A pair of handles 80–81 is used to release the clamping jaws 75–76 from the control surface. Preferably some resilient means, such as a spring 82, is disposed between the handles 80–81 to bias and hold the clamping jaws against the control surface when the handles are released. An enlarged lobe 83 is disposed between one of the handles 80 and the upper jaw 75 to support an electronic module 84 for the electronic circuitry 100. Lobe 83 may be formed integrally with handle 80.

The electronic module 84 is affixed to lobe 83 by any suitable means. Alternatively, lobe 83 and module 84 may be integrally molded as one piece. Electronic module 84 has a display 65 for displaying the angular position of the control surface 74, and a plurality of switches 66–68 that may correspond in function to switches 66–68 of inclinometer 20 in FIG. 1. Electronic module 84 may be similar or identical to electronic module 64 for the inclinometer 20 shown in FIG. 1.

The electronic circuitry 100 contained in the electronic modules 64 and 84 is shown in FIG. 3. Circuitry 100 contains an accelerometer 101, such as part number ADXL202 commercially available from Analog Devices, Inc. of Norwood, Mass. This device is a low cost, low power accelerometer with a measurement range of ±2 g's (two times the force of gravity). It contains two accelerometers disposed at 90° to with respect to each other to measure acceleration along two distinct axes. Such accelerometers are typically used to measure acceleration and deceleration in a variety of dynamic applications. However, in the static mode, this accelerometer is also capable of measuring the force of gravity, i.e, the gravity vector of the earth.

Accelerometer 101 has a pair of output signals on lines 102 and 103. These output signals are digital signals with duty cycles that are proportional to the measured acceleration along each of two axes, as measured by the two accelerometers. The duty cycles are the ratio of the pulse-width of the digital signals to the period. The output period is set, or may be adjusted, by selecting the value of resistor 104. The bandwidth of accelerometer 101 may be set from 0.01 Hz to 5 KHz by the selection of capacitors 106 and 107.

A battery 108 supplies operating power for accelerometer 101 and the other electronic circuitry. Because the current requirements for the electronic circuitry 100 are minimal, battery 108 may be a typical miniature watch battery. An on/off switch 66 is user controllable to activate or deactivate the electronic circuitry 100. When switch 66 is closed to the on position, battery 108 supplies operating power to a terminal 110.

Circuitry 100 also includes a microcontroller 115, which is commercially available from the Atmel Corporation of San Jose, Calif. under part number AT90S8515. However, various other data processors, including microprocessors, microcontrollers, and the like, may also be suitable for this application. Microcontroller 115 receives the output signals from each of the two accelerometers within accelerometer 101 on lines 102 and 103. A counter in microcontroller 115 counts the pulses on lines 102 and 103 and determines from the pulse counts the corresponding angular position of accelerometer 101. The determination of angular position is accurate to within one-tenth of a degree.

A resistor 111 is connected between the operating voltage node 110 and the reset input terminal of microcontroller 115. Thus, each time that on/off switch 66 is switched to the on position, microcontroller 115 is automatically reset and initialized. A programming port 114 is used to program microcontroller 115 in a manner known to the art.

After microcontroller 115 determines the angular position of from the signals furnished by accelerometer 101, the angular information is displayed on a display 65 which may be of the liquid crystal display (LCD) type. For example, if display 65 has three digits such as shown in the displays 64 and 84 of FIGS. 1 and 2 for displaying the angular position, microcontroller 115 may supply digital information representative of each of the three digits to be displayed on display 65 in binary coded decimal (BCD) to seven segment latch/decoder/drivers 117–119 via a plurality of lines 116. Each of the three latch/decoder/drivers 117–119 then supplies information to display 65 to illuminate the appropriate segments for each of the three numerals in the digital display 65. Latch/decoder/drivers 117–119 are commercially available from a number of vendors under a common industry part number 14543.

Data on lines 116 is also supplied to a quad latch 122, which may be of industry part number 14042. Data in the latches 122 is supplied to four exclusive OR gates 123–126. Gates 123–126 exclusive OR the data from latches 122 with a phase signal on a line 121 to provide control outputs to the display 65. For example, gate 123 may supply a #1 signal, gate 124 may supply a MINUS signal, gate 125 may supply a TILDA signal, and gate 126 may supply a TRIANGLE signal, all to display 65. In addition, line 121 supplies a PHASE signal to display 65.

A reference switch 67 is connected to an input of microcontroller 115 to cause the microcontroller to use the current position of the accelerometer 101 as the reference point, or as the 0° reference point. A hold switch 68 will hold the current display of the angular position on the digital display 65, and prevent subsequent calculations of angular positions by microcontroller 115 from being displayed, unless the hold switch is again depressed.

The methods of using the inclinometers 20 and 70 will now be considered. Preferably, the movable or adjustable control surface, such as 24 in FIG. 1 or 74 in FIG. 2, is moved to its normal position, which will be when the control surface 24 or 74 is in general alignment with the wing 22 or 72. Power is then enabled by actuating on/off switch 67. A reference position is then determined with the control surface 24 or 74 in its normal position by pressing reference switch 67. Control surface 24 or 74 is then moved of adjusted to a desired position, such as for takeoff. Again depressing the reference switch will then determine the angular position of the control surface 24 or 74 from the normal or reference position. Thus, any initial angular variances between the normal position of the control surfaces 24 or 74 and the gravity vector due to contours of the ground or due to other surface variations from the horizontal that the airplane is sitting on are eliminated, and a true difference in angular positions of the control surface is determined. When the angular position of the control surface 24 or 74 is determined, the hold button 68 may be pressed to hold the current angular position on display 65. The airplane may then be moved or repositioned for takeoff without disturbing or losing the previously determined angular position. Otherwise, subsequent calculations of the position as determined by microcontroller 115 would be displayed, including erroneous determinations resulting from moving the airplane including its wing from the previously determined reference position. Thus, the change in angular position of the control surface can be measured from any angle, attitude or position, including, but not limited to, the horizontal position.

The electronics can be packaged in a module, such as module 64 in FIG. 1 of relatively small size, such as about one and one-half inches by three-quarters inches (approximately 40 mm by 25 mm). The electronics, including a printed circuit board for the integrated circuits, weighs approximately one-half ounce. The cost of the electronics, including display 65, is also relatively inexpensive at about one-tenth the cost of the least inexpensive inclinometers that are currently commercially available. However, these currently available inclinometers are of a significantly larger size and mass that make them unsuitable for measuring the angles of control surfaces of a model aircraft.

Various other applications for the inclinometers of the present invention will be apparent. For example, the inclinometer 70 is also suited to measure the pitch angle of the rotor blades of a helicopter. Either of inclinometers 20 or 70 may also be suitable for measuring the angle of the stabilizer surfaces of an airplane.

Related methods for measuring the angle of an adjustable surface between a first reference position and a second adjusted position, include the steps of attaching the inclinometer including a pair of accelerometers, a data processor and a display to the adjustable surface, sensing the gravitational vector of the earth with the pair of accelerometers, providing output signals from each accelerometer to the data processor, determining with the data processor the first reference position from the output signals of the pair of accelerometers, determining with the data processor the second adjusted position from the output signals of the pair of accelerometers, determining the angle between the first reference position and the second adjusted position, and displaying the angle on the display. The step of attaching the inclinometer to the adjustable surface further include the steps of centering the inclinometer between the leading and trailing edges of the adjustable surface or attaching the inclinometer to opposite sides of the adjustable surface.

While particular embodiments of the invention have been shown and described, it will be obvious to those skilled in the art that changes and modifications may be made therein without departing from the invention in its broader aspects.

What is claimed is:

1. An inclinometer for measuring the angle between a reference angular position and an angularly adjustable surface of a portion of a wing of an aircraft, said wing having a leading edge and a trailing edge, said inclinometer comprising:
- a pair of accelerometers for sensing the gravitational vector of the earth and for providing an output signal from each accelerometer;
- centering devices for referencing the accelerometers to the leading and trailing edges a portion of the wing of the aircraft;
- a data processor for receiving the output signals from the pair of accelerometers to determine a first reference position of the adjustable surface of the wing, to determine a second adjusted position of the adjustable surface of the wing and to determine an angle between the first reference position and the second adjusted position; and
- a display for receiving information from the data processor and for displaying the angle of the adjustable surface of the wing as determined by the data processor.

2. The inclinometer as claimed in accordance with claim 1 wherein said adjustable surface includes a fixed portion and an angularly adjustable portion.

3. The inclinometer as claimed in accordance with claim 1 wherein said adjustable surface is a control surface of an aircraft.

4. The inclinometer as claimed in accordance with claim 3 wherein said aircraft is a model aircraft.

5. The inclinometer as claimed in accordance with claim 1 further comprising:
- a generally linear beam; and
- a pair of spaced apart and opposing arms that are mounted on said beam,
- said centering devices disposed on each of said arms for engaging the leading and trailing edges of the adjustable surface, respectively.

6. The inclinometer as claimed in accordance with claim 5 wherein said arms are generally perpendicular to said beam.

7. The inclinometer as claimed in accordance with claim 5 wherein at least one of said pair of arms is slidably disposed on said beam.

8. The inclinometer as claimed in accordance with claim 5 wherein said pair of accelerometers, said data processor and said display are disposed on said beam.

9. An inclinometer for measuring the angle between a reference angular position and an angularly adjustable surface of a portion of a wing of an aircraft, said inclinometer comprising:
- a pair of accelerometers for sensing the gravitational vector of the earth and for providing an output signal from each accelerometer;
- said accelerometers attached to the adjustable surface of a portion of the wing of the aircraft;
- a data processor for receiving the output signals from the pair of accelerometers to determine a first reference position of the adjustable surface of the wing, to determine a second adjusted position of the adjustable surface of the wing and to determine an angle between the first reference position and the second adjusted position; and
- a display for receiving information from the data processor and for displaying the angle of the adjustable surface of the wing as determined by the data processor.

10. The inclinometer as claimed in accordance with claim 9 further comprising a clamping device to attach the accelerometers to the adjustable surface.

11. The inclinometer as claimed in accordance with claim 10 wherein said clamping device grips opposite sides of the adjustable surface.

12. The inclinometer as claimed in accordance with claim 10 wherein said pair of accelerometers, said data processor and said display are disposed on said clamping device.

13. The inclinometer as claimed in accordance with claim 9 wherein said adjustable surface is a control surface of an aircraft.

14. The inclinometer as claimed in accordance with claim 13 wherein the aircraft is a model aircraft.

15. A method for measuring the angle of an adjustable surface between a first reference position and a second adjusted position, said method comprising the steps of:
- attaching said inclinometer including a pair of accelerometers, a data processor and a display to said adjustable surface;
- sensing the gravitational vector of the earth with the pair of accelerometers;
- providing output signals from each accelerometer to said data processor;
- determining with the data processor the first reference position from the output signals of the pair of accelerometers;
- determining with the data processor the second adjusted position from the output signals of the pair of accelerometers;
- determining the angle between the first reference position and the second adjusted position; and
- displaying said angle on the display.

16. The method for measuring the angle of an adjustable surface between a first reference position and a second adjusted position as claimed in accordance with claim 15 wherein the step of attaching the inclinometer to the adjustable surface includes centering the inclinometer between leading and trailing edges of the adjustable surface.

17. The method for measuring the angle of an adjustable surface between a first reference position and a second adjusted position as claimed in accordance with claim 15 wherein the step of attaching the inclinometer to the adjustable surface includes gripping opposite sides of the adjustable surface.

18. An inclinometer for measuring the angle between a first reference angular position and a second angularly adjusted position of an adjustable surface, the adjustable surface being a portion of a wing of an aircraft, said wing having a leading edge and a trailing edge, said inclinometer comprising:
- a pair of accelerometers for sensing the gravitational vector of the earth and for providing an output signal from each accelerometer;
- means for referencing the accelerometers to the leading and trailing edges of the the wing of the aircraft;
- data processing means for receiving and processing the output signals from the pair of accelerometers to determine a first reference position of the adjustable surface of the wing, to determine a second adjusted position of the adjustable surface of the wing and to determine an angle between the first reference position and the second adjusted position; and means for displaying the information received from the data processing means and for displaying the angle of the adjustable surface of the wing as determined by the data processing means.

19. The inclinometer as claimed in accordance with claim 18 wherein said adjustable surface includes a fixed portion and an angularly adjustable portion.

20. The inclinometer as claimed in accordance with claim 18 wherein said adjustable surface is a control surface of an aircraft.

21. The inclinometer as claimed in accordance with claim 20 wherein said aircraft is a model aircraft.

22. The inclinometer as claimed in accordance with claim 18 further comprising:

a generally linear beam; and a pair of spaced apart and opposing arms that are mounted on said beam;

said means for referencing disposed on each of said arms for engaging the leading and trailing edges of the adjustable surface, respectively.

23. The inclinometer as claimed in accordance with claim 22 wherein said pair of accelerometers, said data processing means and said means for displaying are disposed on said beam.

24. An inclinometer for measuring the angle between a first reference angular position and a second angularly adjusted position of an adjustable surface, the adjustable surface being a portion of a wing of an aircraft, said inclinometer comprising:

a pair of accelerometers for sensing the gravitational vector of the earth and for providing an output signal from each accelerometer;

means for attaching said accelerometers relative to the adjustable surface of the wing of the aircraft;

data processing means for receiving the output signals from the pair of accelerometers to determine a first reference position of the adjustable surface of the wing, to determine a second adjusted position of the adjustable surface of the wing and to determine an angle between the first reference position and the second adjusted position; and means for displaying the information received from the data processing means and for displaying the angle of the adjustable surface of the wing as determined by the data processing means.

25. The inclinometer as claimed in accordance with claim 24 wherein said means for attaching the accelerometers relative to the adjustable surface comprise clamping means for gripping opposite sides of the adjustable surface.

26. The inclinometer as claimed in accordance with claim 25 wherein said pair of accelerometers, said data processing means and said means for displaying are disposed on said clamping means.

27. The inclinometer as claimed in accordance with claim 24 wherein said adjustable surface is a control surface of an aircraft.

28. The inclinometer as claimed in accordance with claim 27 wherein the aircraft is a model aircraft.

* * * * *